(12) United States Patent
Fait

(10) Patent No.: US 10,060,559 B2
(45) Date of Patent: Aug. 28, 2018

(54) UNDERWATER UTILITY LINE

(71) Applicant: Mitchell Fait, Colorado Springs, CO (US)

(72) Inventor: Mitchell Fait, Colorado Springs, CO (US)

( * ) Notice: Subject to any disclaimer, the term of this patent is extended or adjusted under 35 U.S.C. 154(b) by 826 days.

(21) Appl. No.: 14/600,456

(22) Filed: Jan. 20, 2015

(65) Prior Publication Data

US 2015/0204466 A1     Jul. 23, 2015

Related U.S. Application Data

(60) Provisional application No. 61/929,309, filed on Jan. 20, 2014.

(51) Int. Cl.
| | | |
|---|---|---|
| *F16L 1/12* | (2006.01) | |
| *F16L 11/133* | (2006.01) | |
| *H01B 7/00* | (2006.01) | |
| *G01V 1/20* | (2006.01) | |
| *G01V 1/38* | (2006.01) | |

(Continued)

(52) U.S. Cl.
CPC ............ *F16L 11/133* (2013.01); *B63B 35/04* (2013.01); *B63B 35/607* (2013.01); *B63B 35/613* (2013.01); *F16L 1/12* (2013.01); *F16L 1/15* (2013.01); *F16L 1/20* (2013.01); *F16L 1/235* (2013.01); *F16L 1/24* (2013.01); *G01V 1/201* (2013.01); *G01V 1/3808* (2013.01); *H01B 7/00* (2013.01); *H01B 7/0072* (2013.01); *H02G 9/00* (2013.01); *H02G 1/10* (2013.01); *H02G 9/12* (2013.01)

(58) Field of Classification Search
CPC ... F16L 11/12; F16L 1/18; F16L 1/166; F16L 11/133; F16L 1/15; F16L 1/24; F16L 1/235; F16L 1/12; F16L 1/20; H01B 7/00; H01B 7/0072; B63B 35/04; B63B 35/613; B63B 2205/08; B63B 35/607; F03B 13/10; F03B 13/12; F03B 13/14; E21B 17/012; G01V 1/3808; G01V 1/201
USPC .............. 138/110, 118, 119; 174/116, 113 C, 174/100 R, 47; 226/108; 405/166, 167, 405/171, 158
See application file for complete search history.

(56) References Cited

U.S. PATENT DOCUMENTS 3,321,925 A * 5/1967 Shaw ...................... F16L 1/166
                                                        226/108
3,346,015 A    10/1967 Kikukawa
(Continued)

FOREIGN PATENT DOCUMENTS

JP      H09242657      9/1997

OTHER PUBLICATIONS

International Search Report and Written Opinion dated Jul. 8, 2015 for PCT/US2015/012001, Applicant Mitchell Fait.

*Primary Examiner* — Arnold Kinkead
(74) *Attorney, Agent, or Firm* — Thorpe North & Western, LLP

(57) ABSTRACT

An underwater utility line, and associated systems and methods are disclosed. The underwater utility line can include an adjustably buoyant tube. The underwater utility line can also include a transmission line to transfer energy disposed in an interior of the adjustably buoyant tube. The underwater utility line can further include a gas source and a controller to control the gas provided by the gas source to alter the buoyancy of the adjustably buoyant tube.

34 Claims, 14 Drawing Sheets

(51) Int. Cl.
*B63B 35/613* (2006.01)
*F16L 1/235* (2006.01)
*B63B 35/607* (2006.01)
*B63B 35/04* (2006.01)
*F16L 1/20* (2006.01)
*F16L 1/24* (2006.01)
*H02G 9/00* (2006.01)
*F16L 1/15* (2006.01)
*H02G 1/10* (2006.01)
*H02G 9/12* (2006.01)

(56) References Cited

U.S. PATENT DOCUMENTS

| | | |
|---|---|---|
| 3,371,739 A | 3/1968 | Pearson |
| 3,425,453 A | 2/1969 | Fuller |
| 3,569,725 A | 3/1971 | Rosenberg |
| 3,909,774 A | 9/1975 | Pavey, Jr. |
| 4,015,435 A * | 4/1977 | Shaw ................ F16L 1/18 405/166 |
| 4,792,290 A | 12/1988 | Berg |
| 6,239,363 B1 | 5/2001 | Wooters |
| 7,872,363 B2 | 1/2011 | Morse |
| 7,900,571 B2 | 3/2011 | Jaber et al. |
| 8,334,605 B2 | 12/2012 | Catinella |
| 2003/0121255 A1 | 7/2003 | Dick |
| 2003/0137150 A1 | 7/2003 | Shu |
| 2003/0193197 A1 | 10/2003 | Hibbs et al. |
| 2008/0267712 A1 | 10/2008 | Jean et al. |
| 2010/0019497 A1 | 1/2010 | Reiff |
| 2010/0084868 A1 | 4/2010 | Shin |
| 2010/0123313 A1 | 5/2010 | Hobdy |
| 2010/0230971 A1 | 9/2010 | Mackie |
| 2011/0031749 A1 | 2/2011 | Sapir et al. |
| 2011/0031753 A1 | 2/2011 | Moore et al. |
| 2011/0163547 A1 | 7/2011 | Frishberg |
| 2012/0120759 A1* | 5/2012 | Le Page ............ G01V 1/201 367/18 |
| 2012/0207547 A1* | 8/2012 | Guzick ............ E21B 17/012 405/166 |
| 2012/0248865 A1 | 10/2012 | Eder et al. |
| 2012/0261923 A1 | 10/2012 | Hassavari |
| 2014/0117673 A1 | 5/2014 | Phillips |
| 2014/0126865 A1 | 5/2014 | Chang |

* cited by examiner

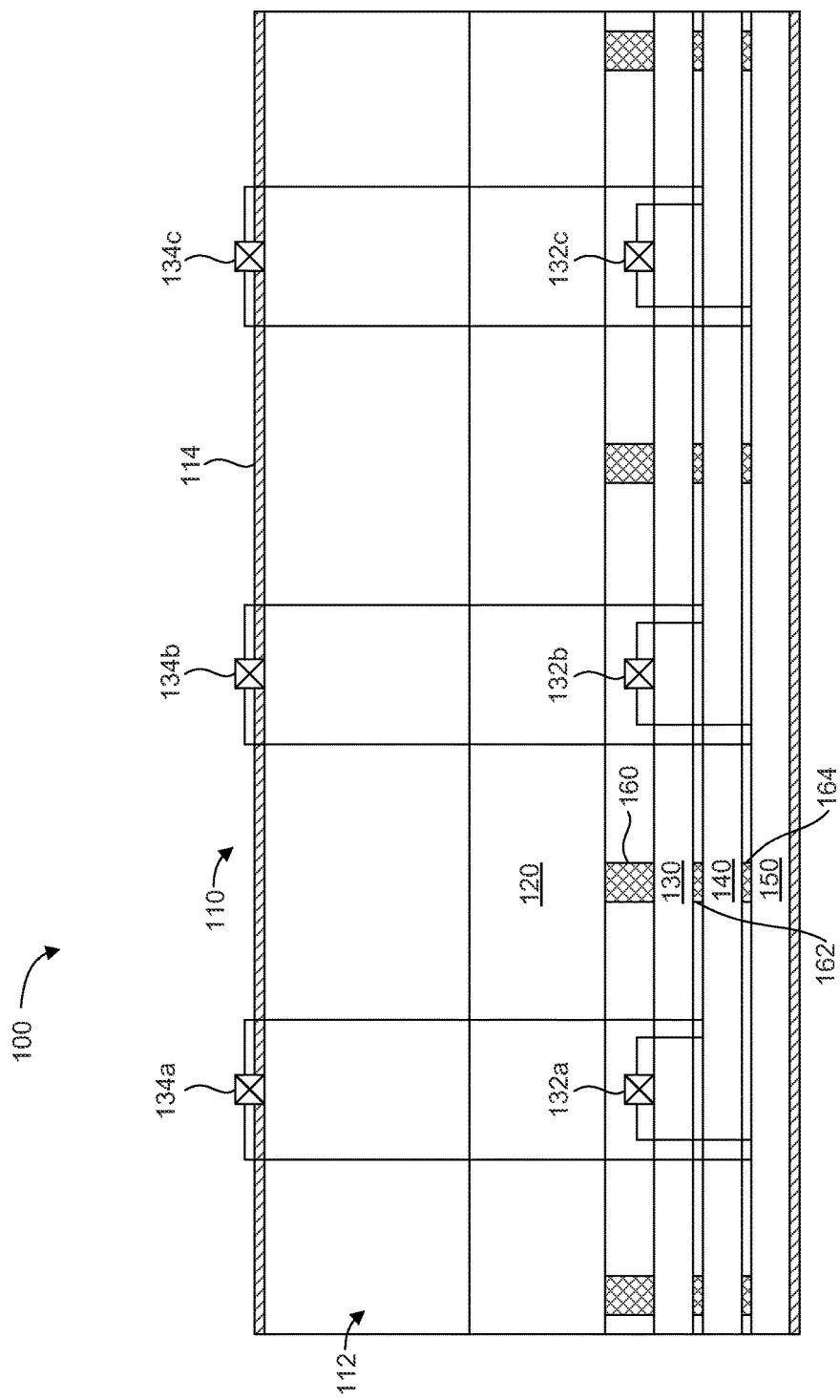

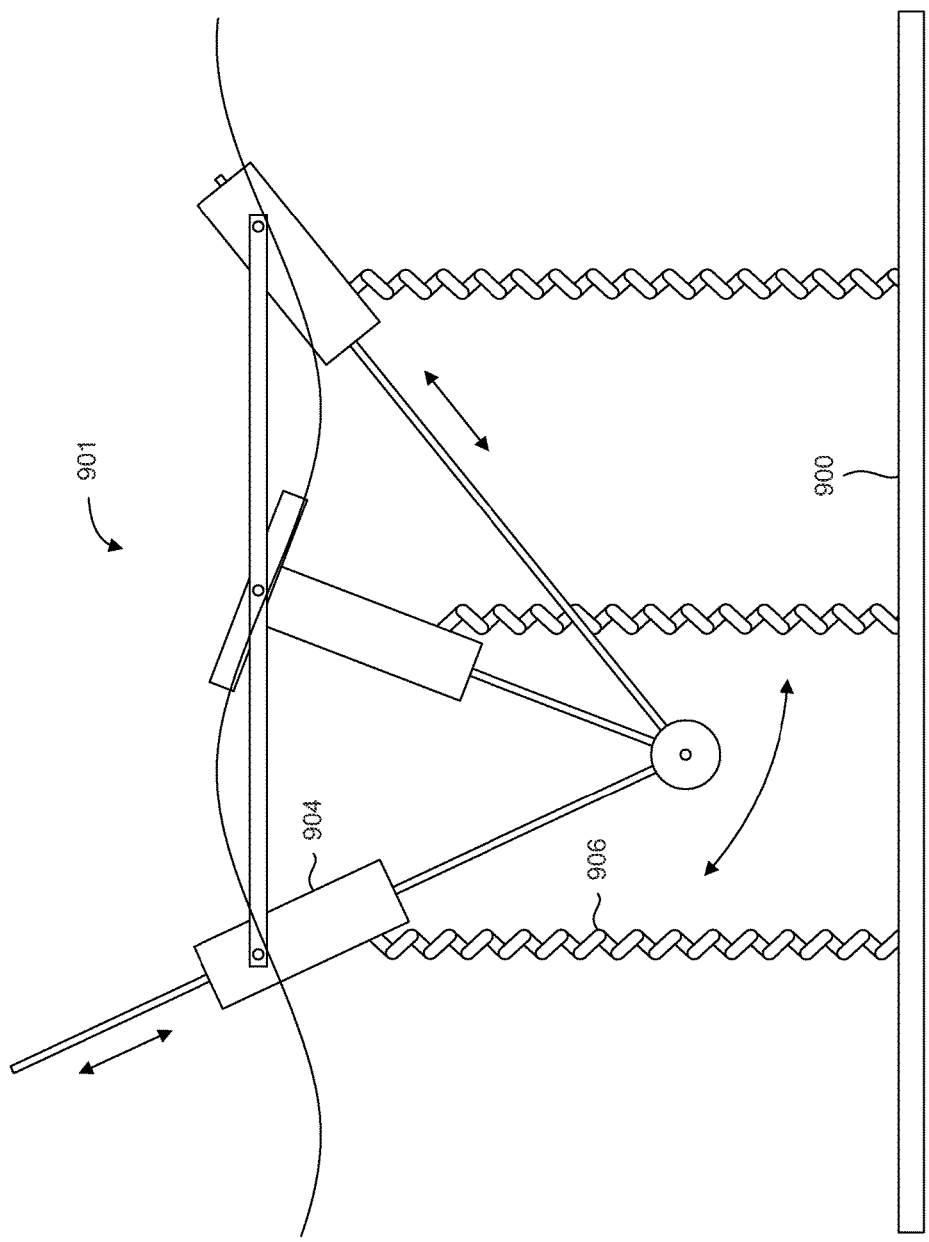

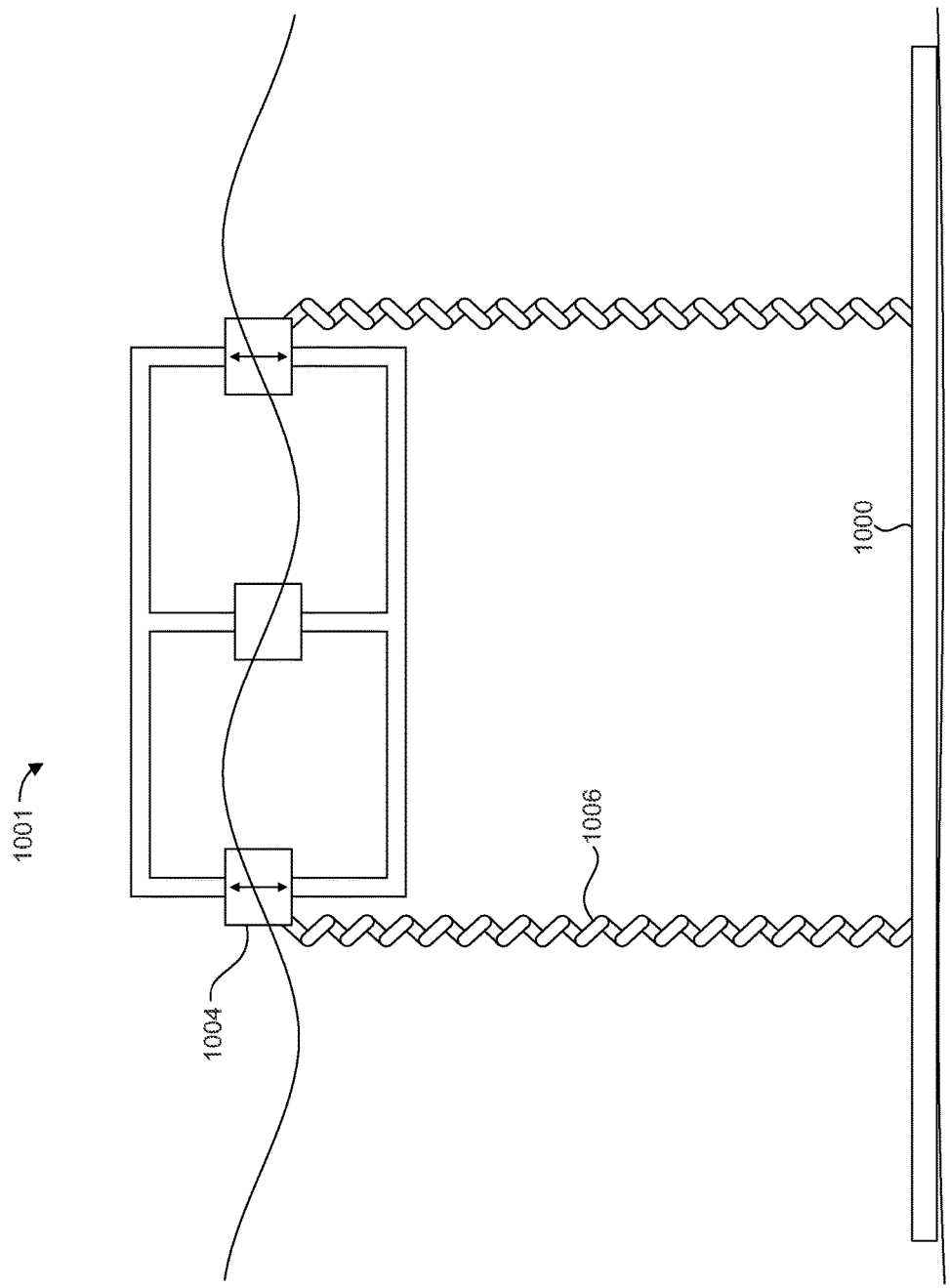

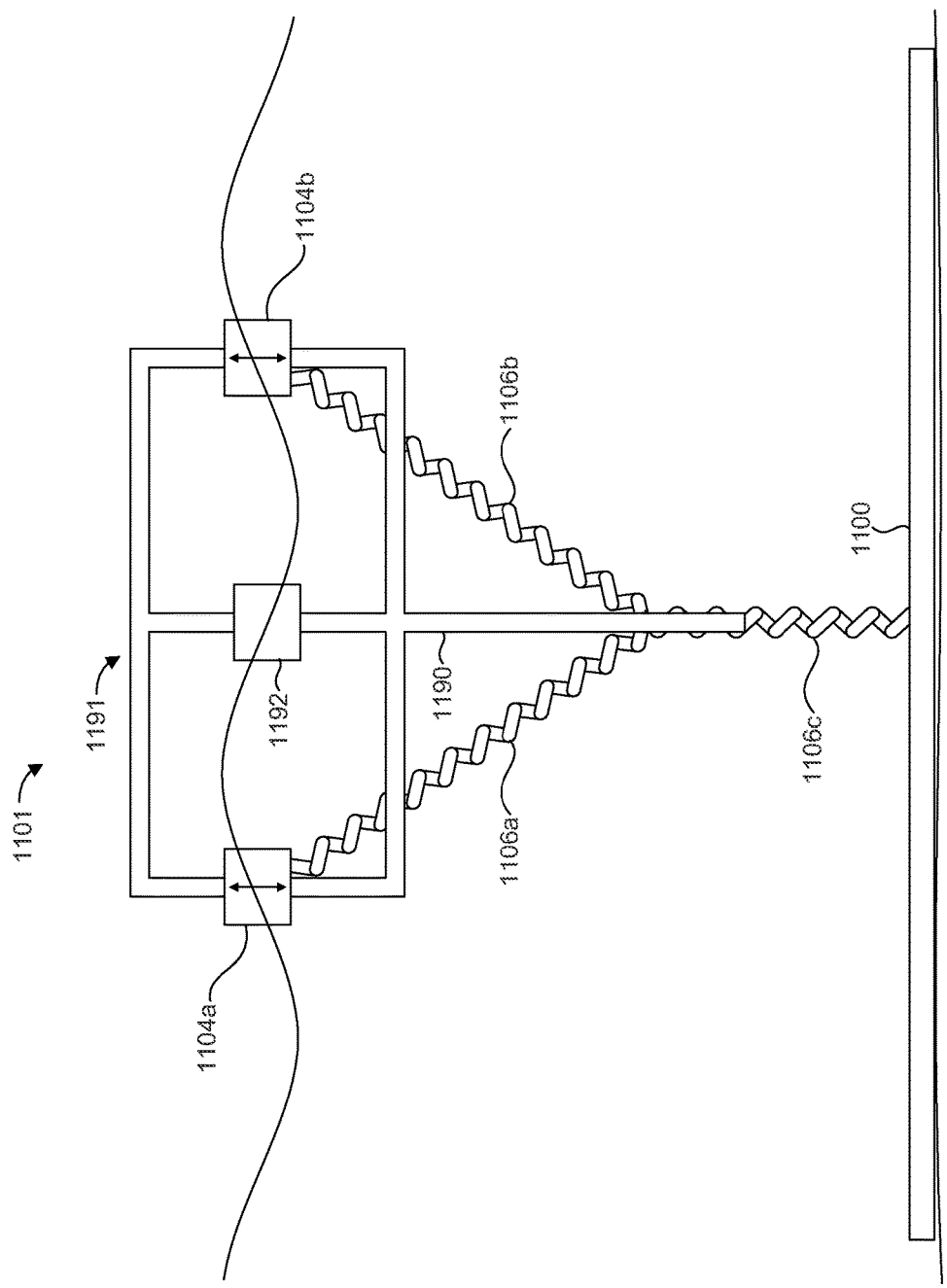

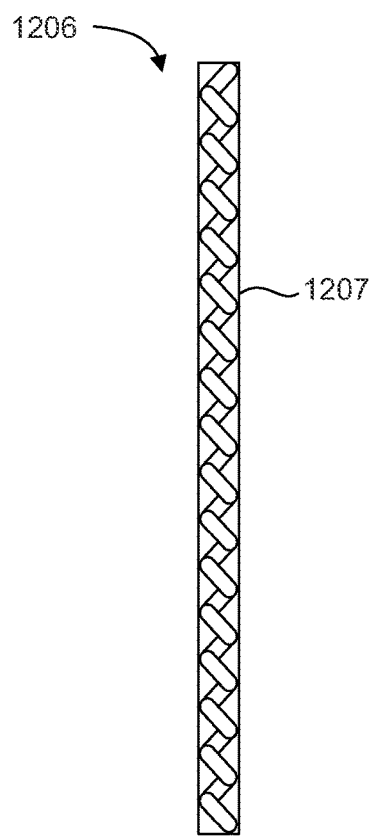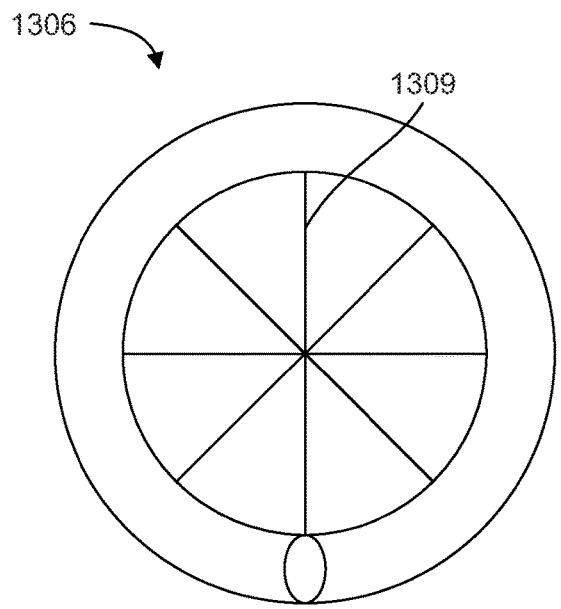
*FIG. 11*  *FIG. 12*

UNDERWATER UTILITY LINE

RELATED APPLICATION

This application claims the benefit of U.S. Provisional Application No. 61/929,309, filed Jan. 20, 2014, which is incorporated herein by reference.

BACKGROUND

The ocean has great potential for generating usable energy if it can be harnessed efficiently. For example, ocean waves, high and low ocean tides, and/or temperature differences in the water are a several ways that the ocean can be used to generate useable energy. Ocean waves, in particular, can have a significant amount of kinetic energy and this energy can be used to power various systems. Although there are many systems for generating energy from the movement of ocean water, there is a continued need for improvements in transferring energy from a power generation system to another location, such as a power grid on shore. Some such devices utilize a buoyant tube to transfer such energy.

BRIEF DESCRIPTION OF DRAWINGS

FIG. 1A is an illustration of an underwater utility line in accordance with an example of the present disclosure.

FIG. 9 is an illustration of an underwater utility system in accordance with still another example of the present disclosure.

FIG. 10A is an illustration of an underwater utility system in accordance with a further example of the present disclosure.

FIG. 10B is an illustration of an underwater utility system in accordance with an additional example of the present disclosure.

FIG. 11 is a side view of a tether or feed line of an underwater utility system in accordance with an example of the present disclosure.

FIG. 12 is a top view of a tether or feed line of an underwater utility system in accordance with another example of the present disclosure.

DETAILED DESCRIPTION

Figure 1B:
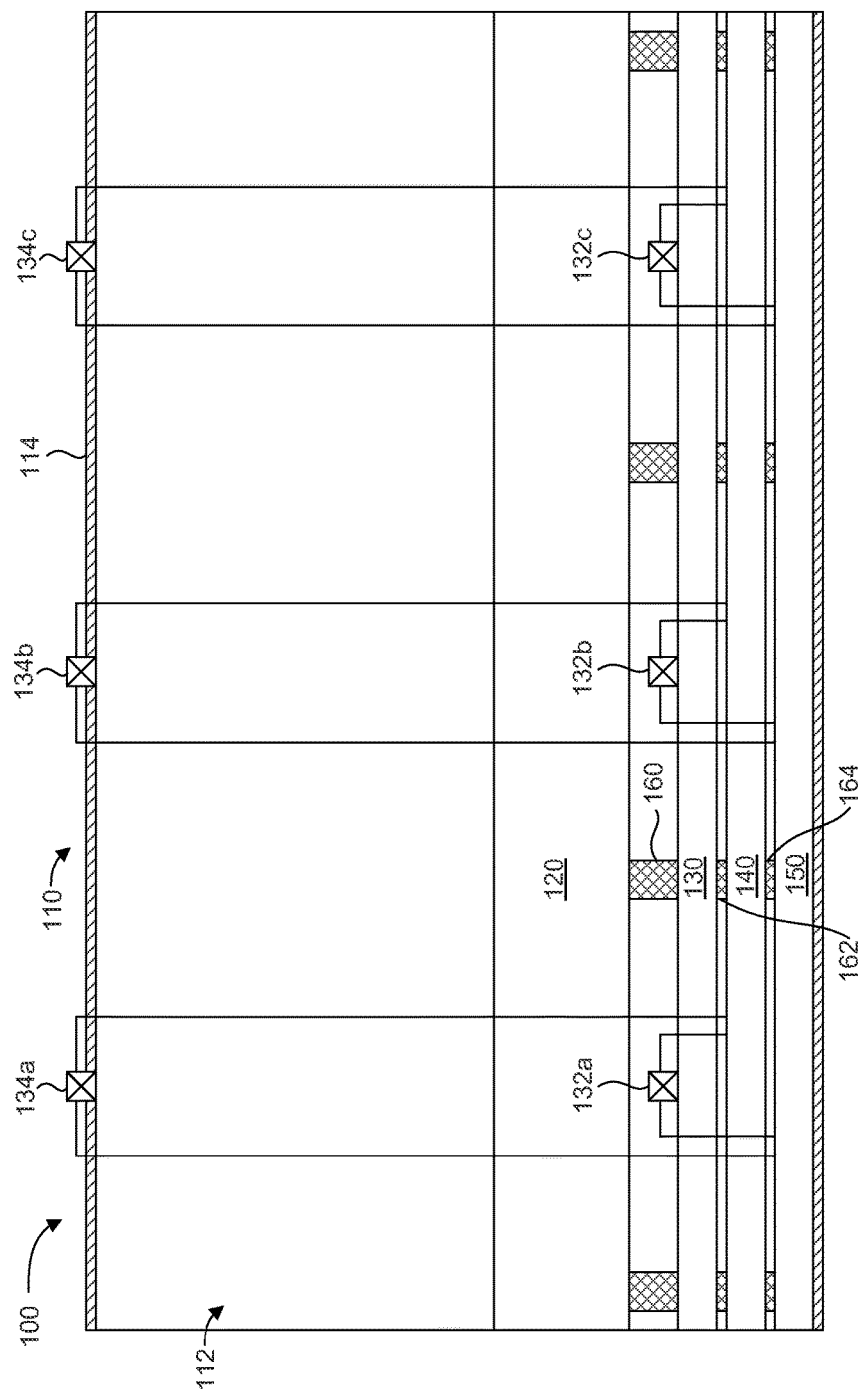
FIG. 1B is the underwater utility line of FIG. 1A in an expanded configuration accordance with an example of the present disclosure.

Reference will now be made to the exemplary embodiments, and specific language will be used herein to describe the same. It will nevertheless be understood that no limitation of the scope of the disclosure is thereby intended. Alterations and further modifications of the inventive features illustrated herein, and additional applications of the principles of the technology as illustrated herein, which would occur to one skilled in the relevant art and having possession of this disclosure, are to be considered within the scope of the disclosure. It is also to be understood that the terminology used herein is used for the purpose of describing particular embodiments only. The terms are not intended to be limiting unless specified as such.

It should be noted that, as used in this specification and the appended claims, the singular forms "a," "an," and "the" include plural referents unless the content clearly dictates otherwise.

In describing embodiments of the present disclosure, reference may be made to "first" or "second" as they relate to certain structures, for example. It is noted that these are merely relative terms, and a structure described or shown as a "first" structure could just as easily be referred to a "second" structure, and such description is implicitly included herein.

Dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

In accordance with these definitions and embodiments of the present disclosure, a discussion of the various systems and methods is provided including details associated therewith. This being said, it should be noted that various embodiments will be discussed as they relate to the systems and methods. Regardless of the context of the specific details as they are discussed for any one of these embodiments, it is understood that such discussion relates to all other embodiments as well.

Although some devices for transferring energy from a wave power generation system to another location have utilized a buoyant tube, the buoyancy of these tubes may not be adjustable after installation of the tube on site, which can limit the usefulness and capabilities of the tube and associated power generation system. Thus, there is a need for an improved device for transferring wave-generated energy in a body of water.

Accordingly, the present disclosure is drawn to an underwater utility line. The underwater utility line can include an adjustably buoyant tube. The underwater utility line can also include a transmission line to transfer energy disposed in an interior of the adjustably buoyant tube. The underwater utility line can further include a gas source and a controller to control the gas provided by the gas source to alter the buoyancy of the adjustably buoyant tube.

The present disclosure is also drawn to an underwater utility system. The underwater utility system can include an underwater utility line. The underwater utility line can include an adjustably buoyant tube, a transmission line within an interior of the adjustably buoyant tube, and a controller to control the buoyancy of the adjustably buoyant tube. Additionally, the system can include a buoy coupled to the underwater utility line.

In one aspect, the disclosure provides a method for transferring energy through a body of water. The method can include connecting an underwater utility line to an energy source and an energy destination, the underwater utility line having an adjustably buoyant tube, and a transmission line to transfer energy disposed in an interior of the adjustably buoyant tube. The method can also include providing gas to the adjustably buoyant tube. In addition, the method can include controlling the gas provided by the gas source to alter the buoyancy of the adjustably buoyant tube.

Figure 1C:
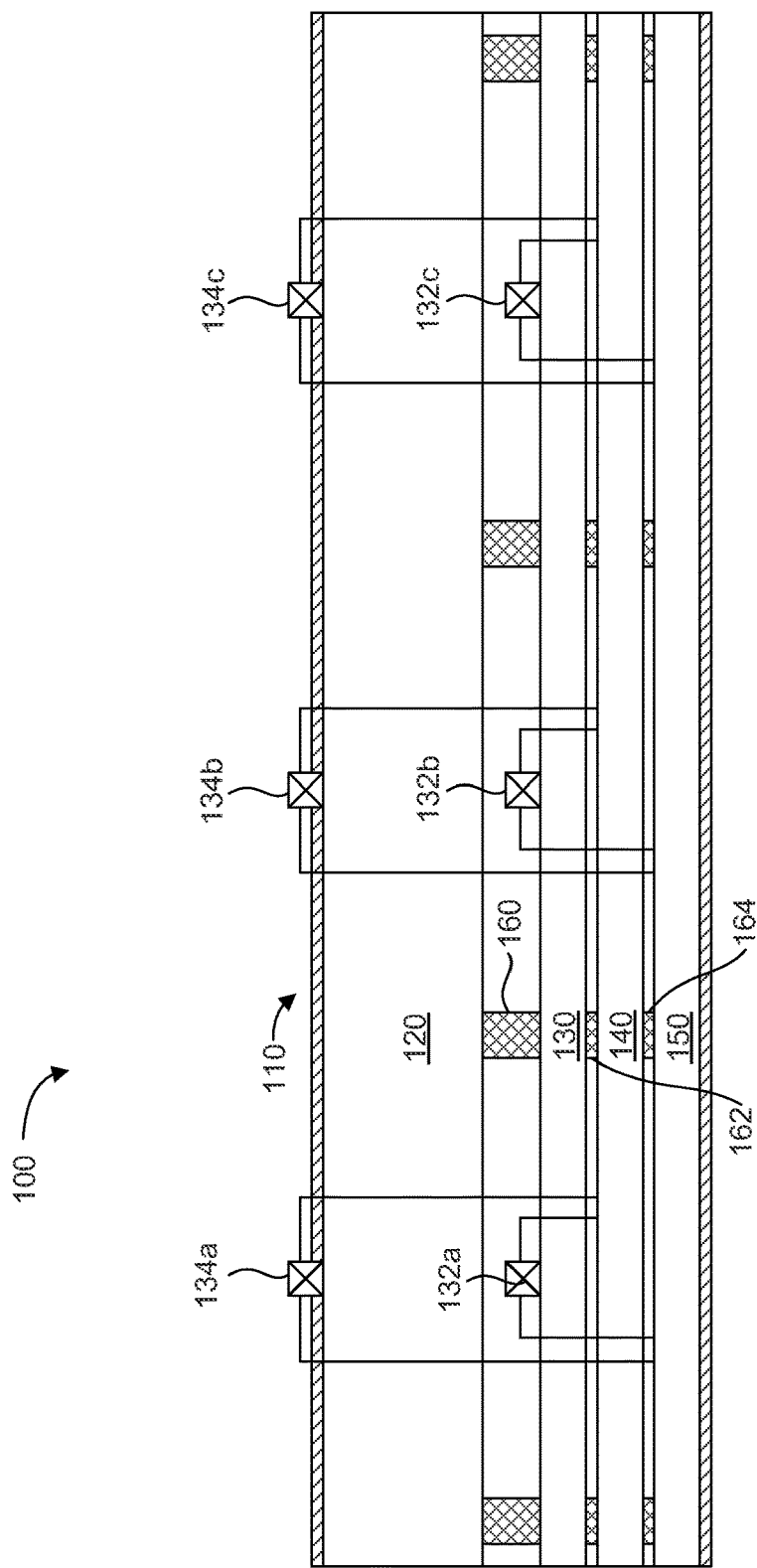
FIG. 1C is the underwater utility line of FIG. 1A in a contracted configuration.

FIGS. 1A-1C illustrate an underwater utility line 100 in accordance with an example of the present disclosure. The underwater utility line 100 can include an adjustably buoyant tube 110 and a transmission line 120 disposed in an interior 112 of the adjustably buoyant tube. The transmission line can transfer energy from a power generator (such as a wave power generator) to a desired destination location (such as a ship or a power grid). Accordingly, the transmission line can be adapted to carry water (i.e., such transmission line 120 is hollow and watertight) and/or configured as an electrical conductor. The underwater utility line 100 can also include a gas source 130 (e.g., a gas supply line), and a controller 140 to control the gas provided by the gas source to alter the buoyancy of the adjustably buoyant tube 110 thereby causing the utility line 100 to "float" or "sink" in a controllable manner to achieve a desired depth in a body of water. In general, the buoyancy of the adjustably buoyant tube 110 can be controlled with any technology known in the art. In one aspect, the gas source 130 can be fluidly coupled to the interior of the adjustably buoyant tube 110 to provide gas to the interior of the tube.

In one aspect, the underwater utility line 100 can include one or more gas injection valves 132a-c in fluid communication with the gas source 130. The underwater utility line 100 can also include one or more gas expulsion valves 134a-c associated with a wall 114 of the adjustably buoyant tube 110. The underwater utility line 100 can further include a source of power, such as an electrical line 150, which can be used to power the gas injection valves 132a-c and/or the gas expulsion check valves 134a-c. In one aspect, the controller 140 can communicate with and control the gas injection valves 132a-c and/or gas expulsion check valves 134a-c. For example, the gas injection valves 132a-c can selectively introduce gas into the adjustably buoyant tube 110 and the gas expulsion valves 134a-c can selectively evacuate gas from the adjustably buoyant tube 110 to adjust the buoyancy of the tube. The controller 140 can be in communication with the gas injection valves 132a-c and/or the gas expulsion valves 134a-c via a hardwired connection (shown) and/or wireless connection with a transmitter and a receiver to control the gas injection valves 132a-c and the gas expulsion valves 134a-c.

In one aspect, illustrated in FIGS. 1A-1C, the adjustably buoyant tube 110 can be diametrically expandable by gas. Thus, buoyancy of the underwater utility line 100 can be controlled by having the adjustably buoyant tube 110 be constructed of any expandable material known in the art and increasing the pressure of the gas, preferably air, in the adjustably buoyant tube 110 to expand the adjustably buoyant tube 110 (FIG. 1B) and thereby increase the volume and buoyancy or decreasing the pressure of the gas in the adjustably buoyant tube 110 to allow the volume of the adjustably buoyant tube 110 to contract (FIG. 1C) and the buoyancy to decrease.

The gas injection valves 132a-c, which are in fluid communication with the gas supply line 130, can inject gas (e.g., air) into the adjustably buoyant tube 110. The gas expulsion valves 134a-c, which can be in the wall 114 of the adjustably buoyant tube 110 preferably near the top of the tube, can expel the gas from the adjustably buoyant tube 110. The gas expulsion valves 134a-c can be check valves allowing gas to escape from the adjustably buoyant tube 110 but not permitting water to enter the adjustably buoyant tube 110. It should be recognized that if the adjustably buoyant tube 110 is of sufficiently short length, the gas can simply be introduced from one or more ends of the adjustably buoyant tube 110. Similarly, if the adjustably buoyant tube 110 is sufficiently short, the gas can simply be expelled from one or more ends of the adjustably buoyant tube 110.

Although the gas source 130, the controller 140, and the electrical line 150 are shown located within the adjustably buoyant tube 110, it should be recognized that the gas supply line 130, the controller 140, and/or the electrical line 150 can be located external to the adjustably buoyant tube 110 but in communication with the interior of the adjustably buoyant tube 110 or components within the adjustably buoyant tube 110 as appropriate to perform as described herein.

In one aspect, the transmission line 120 can be held by one or more supports 160 spaced along the interior 112 of the adjustably buoyant tube 110, although it should also be recognized that the transmission line 120 can simply rest inside the adjustably buoyant tube 110. One or more supports 162, 164 can also be used to support the gas source 130, the controller 140, and/or the electrical line 150.

Figure 2:
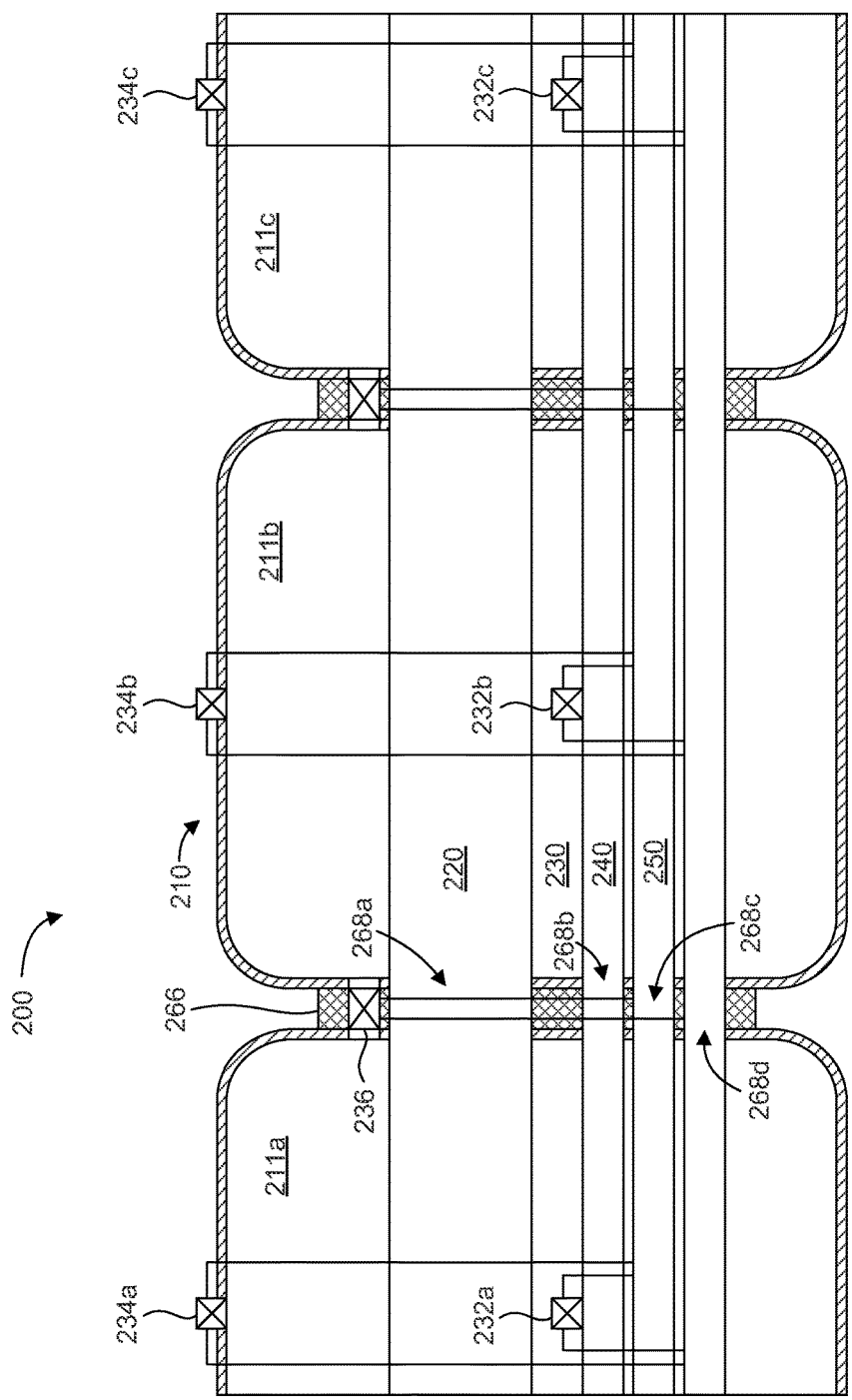
FIG. 2 is an illustration of an underwater utility line in accordance with another example of the present disclosure.

FIG. 2 illustrates an underwater utility line 200 in accordance with another example of the present disclosure. As with the underwater utility line 100 of FIGS. 1A-1C, the underwater utility line 200 can include an adjustably buoyant tube 210, a transmission line 220, a gas source 230, a controller 240, one or more gas injection valves 232a-c, one or more gas expulsion check valves 234a-c, and an electrical line 250 to power the gas injection valves 232a-c and the gas expulsion check valves 234a-c. In this case, the adjustably buoyant tube 210 can be divided into compartments 211a-c with one or more spacers 266. If the adjustably buoyant tube 210 is so divided, each such spacer 266 can have one or more apertures (designated the "spacer apertures") 268a-d to allow the transmission line 220, the gas source 230, the controller 240, and the electrical line 250 to pass through the spacer 266. The spacer 266 can also serve as a support for the transmission line 220, the gas source 230, the controller 240, and/or the electrical line 250.

If the spacer 266 is impermeable to the gas utilized, then one or more valves 236 (i.e., gas transit valves) can be included between the compartments 211a-c to allow the gas to pass through (or transit) such spacers 266. Any technology known in the art can be utilized, such as using the electrical line 250 and the controller 240 to remotely open and close the valves 236. In one aspect, the gas supply line 230 can have gas injection valves 232a-c located along the gas source 230 at such distances that at least one gas injection valve 232a-c can be placed between each set of adjacent supports 266, as well as at least one gas expulsion valve 234a-c. Utilizing compartments 211a-c can enable the buoyancy to be different between different sets of adjacent spacers 266, provided the transmission line 220, the gas supply line 230, the electrical line 250, and the controller 240 sealingly pass through each spacer aperture 268a-d. In one aspect, the spacers 266 can be permeable to the gas used. In this case, the gas source 230 need not pass through the spacers and fewer than one gas injection valve and one gas expulsion valve per compartment can be utilized.

Figure 3:
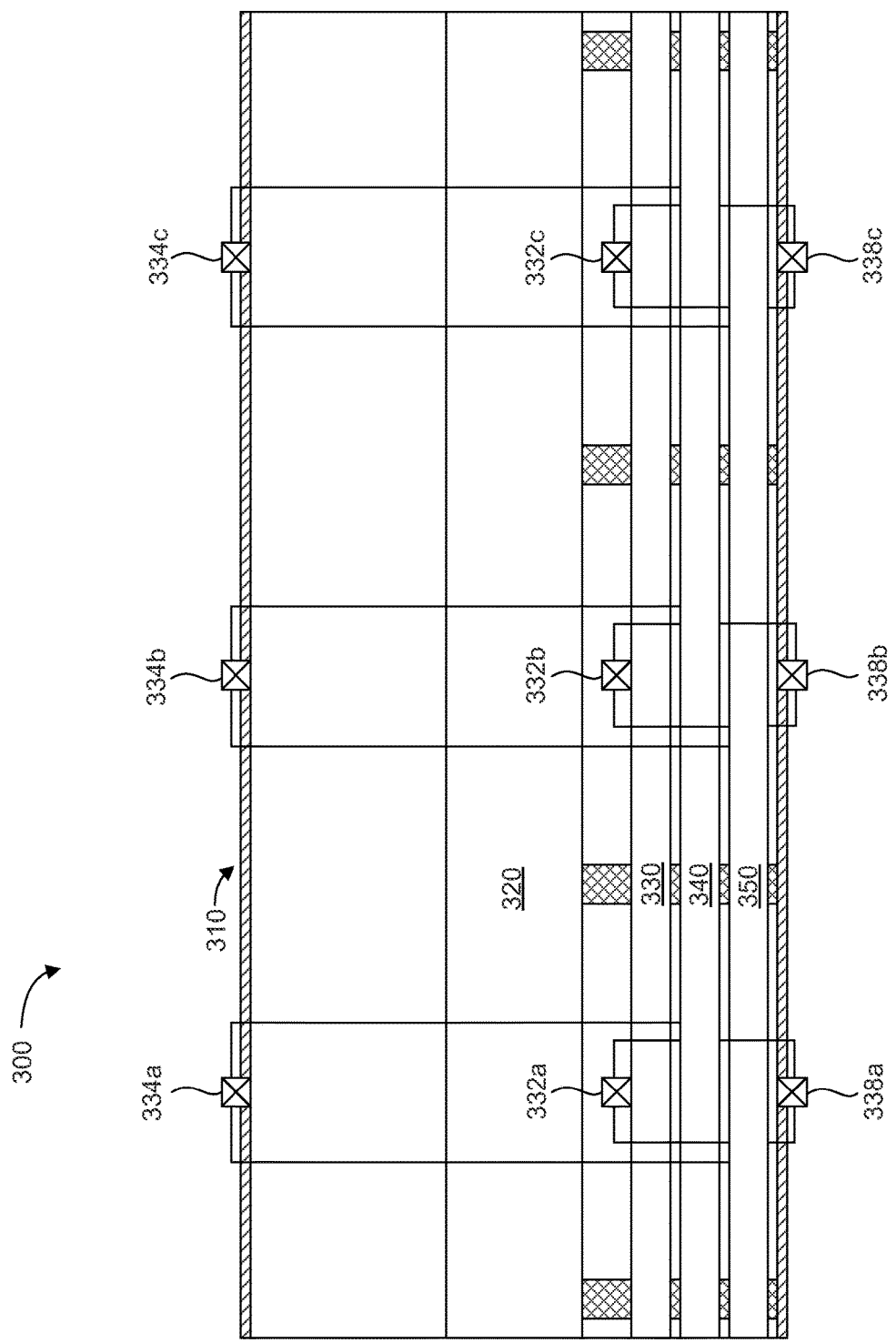
FIG. 3 is an illustration of an underwater utility line in accordance with yet another example of the present disclosure.

FIG. 3 illustrates an underwater utility line 300 in accordance with yet another example of the present disclosure. The underwater utility line 300 is similar to the underwater utility line 100 of FIGS. 1A-1C in many respects. For example, the underwater utility line 300 can include an adjustably buoyant tube 210, a transmission line 220, a gas source 230, a controller 240, one or more gas injection valves 232a-c, one or more gas expulsion check valves 234a-c, and an electrical line 250 to power the gas injection valves 232a-c and the gas expulsion check valves 234a-c. In this case, the adjustably buoyant tube 210 has a fixed diameter. Thus, the buoyancy of the underwater utility line 300 can be controlled by flooding the adjustably buoyant tube 310 and purging water from the adjustably buoyant tube 310 utilizing technology similar to that used on a submarine to flood one or more ballast tanks with water and purge such tanks with air. Accordingly, the underwater utility line 300 can include one or more flood ports 338a-c associated with a wall 314 (i.e., near a bottom) of the adjustably buoyant tube. When buoyancy is adjusted by flooding the adjustably buoyant tube 310 and purging water therefrom, all the structure utilized above with gas and the expandable adjustably buoyant tube 310 can be employed except that the tube 310 is not "expandable," i.e., a change in internal or external pressure could produce some change in the diameter of the adjustably buoyant tube 310 but not to the degree that one of ordinary skill in the art would term the tube 310 "expandable."

Gas can be evacuated from the adjustably buoyant tube 310 by operating the gas supply line 330 in reverse and/or by allowing gas to escape from the adjustably buoyant tube 310 via the gas expulsion check valves 334a-c near the top of the adjustably buoyant tube 310, with such gas expulsion check valves 334a-c not permitting water to enter the adjustably buoyant tube 310. When it is desired to decrease the buoyancy of the underwater utility line 300, or of a compartment in the underwater utility line 300, the flood ports 338a-c can be opened to allow water to enter the adjustably buoyant tube 310, and the gas supply line 330 can be operated to withdraw gas from the adjustably buoyant tube 310 and/or the gas expulsion check valves 334a-c can be opened to allow gas to escape from the adjustably buoyant tube 310 if the gas pressure is sufficiently high. When it is desired to increase the buoyancy of the underwater utility line 300, or of a compartment in the underwater utility line 300, the gas supply line 330 can be operated to introduce gas into the adjustably buoyant tube 310 and the flood ports 338a-c can be opened to allow the introduced gas to force water to exit the adjustably buoyant tube 310 through such flood ports 338a-c.

Figure 4:
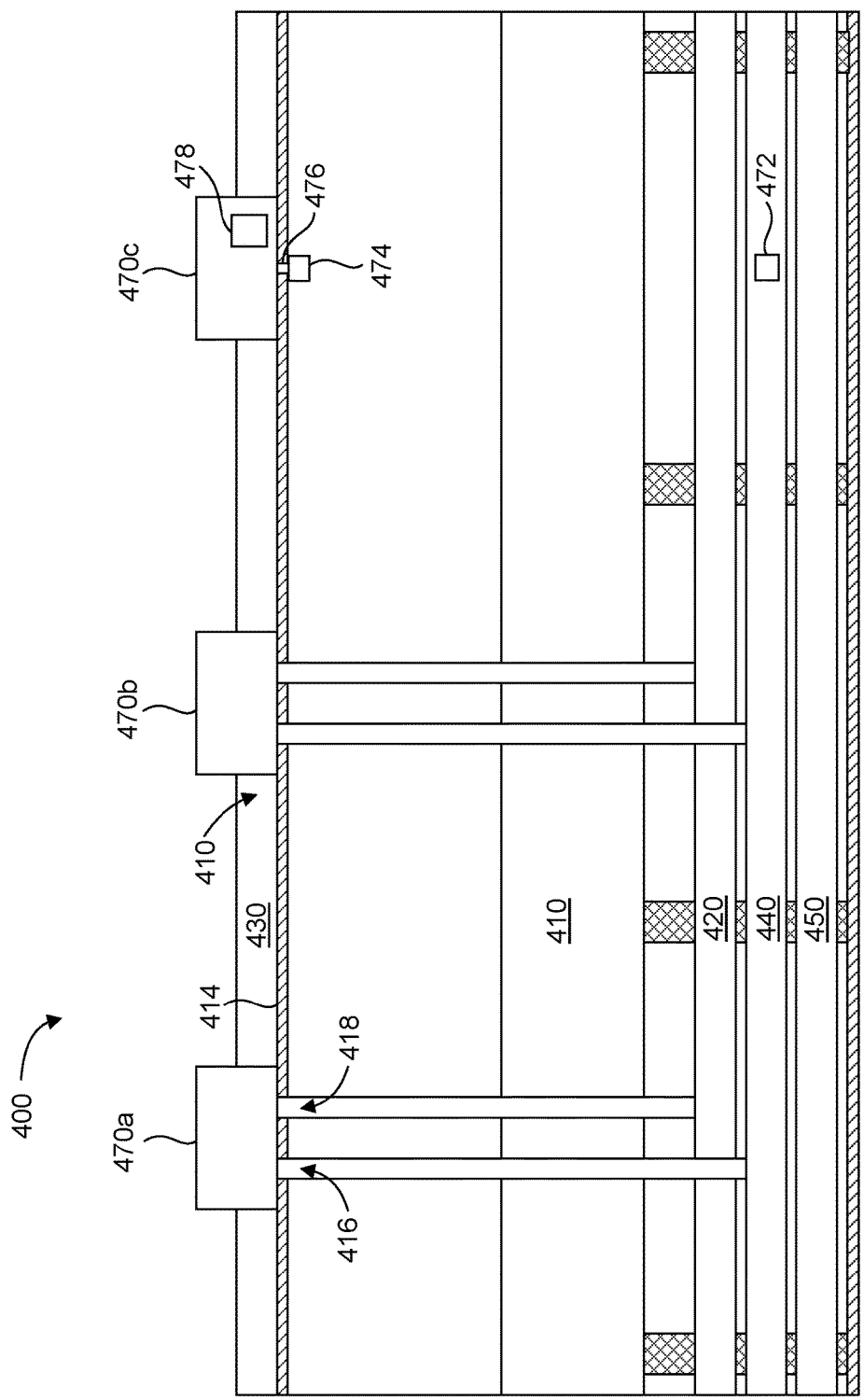
FIG. 4 is an illustration of an underwater utility line in accordance with still another example of the present disclosure.

FIG. 4 illustrates an underwater utility line 400 in accordance with still another example of the present disclosure. As with other underwater utility lines disclosed herein, the underwater utility line 400 can include an adjustably buoyant tube 410, a transmission line 420, a gas source 430, a controller 440, and an electrical line 450. In this case, the underwater utility line 400 includes one or more buoyancy compensators 470a-c in fluid communication with the gas source 430 to alter the buoyancy of the underwater utility line 400. The buoyancy compensators 470a-c can each include a bladder that can be filled with gas from the gas source 430. Buoyancy can be controlled by adjusting the volume of air in the bladder. Thus, the buoyancy of the underwater utility line 400 can be adjusted utilizing technology used in SCUBA diving vest BC buoyancy compensators, i.e., one or more buoyancy compensators 470a-c adapted using any technique known in the art for attachment of the buoyancy compensators to the adjustably buoyant tube 410, rather than to a human being. The gas source 430 is shown located outside the adjustably buoyant tube 410 proximate the buoyancy compensators 470a-c, although the gas source can be disposed in any suitable location. In some embodiments, the gas source may be a compressed gas container disposed within or otherwise associated with the buoyancy compensators. In this case, there may not be a need for a gas supply line.

The electrical line 450 and the controller 440 can be coupled to the buoyancy compensators 470a-b via hardline connections to control the buoyancy with the buoyancy compensators 470a-b. The electrical line 450 and the controller 440 can be located within or, optionally, on the exterior of the adjustably buoyant tube 410. When the electrical line 450 and the hard wire control line 440 are within the adjustably buoyant tube, hard wire connections can sealingly pass through one or more apertures 416, 418, designated "wall apertures," in the wall 414 of the adjustably buoyant tube 410 to connect to each of the one or more buoyancy compensators 470a-b.

In one aspect, the controller 440 can communicate with the buoyancy compensator 470c utilizing a radio transmitter 472 and a radio receiver 474 to facilitate the control and operation of the buoyancy compensator 470c. In this case, a wire 476 can sealingly pass through a wall aperture to provide communication through the wall 414 between the radio receiver 474 and the buoyancy compensator 470c. In another aspect, a battery 478 can be utilized in lieu the electrical line 450 to power the buoyancy compensator 470c.

Figure 5:
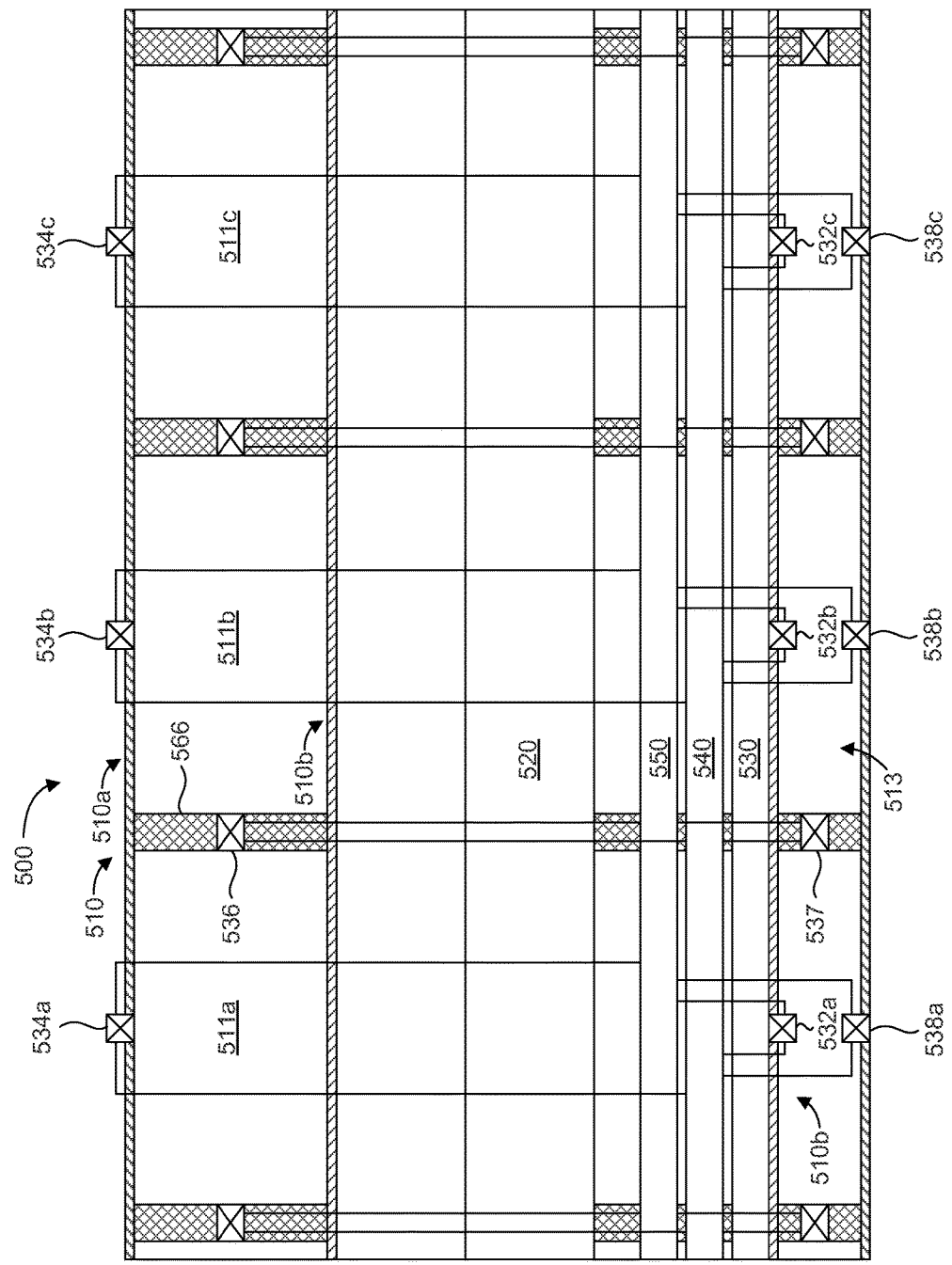
FIG. 5 is an illustration of an underwater utility line in accordance with a further example of the present disclosure.

FIG. 5 illustrates an underwater utility line 500 in accordance with a further example of the present disclosure. As with other underwater utility lines disclosed herein, the underwater utility line 500 can include an adjustably buoyant tube 510a, a transmission line 520, a gas source 530, a controller 540, and an electrical line 550. The underwater utility line 500 can also include one or more gas injection valves 532a-c, one or more gas expulsion check valves 534a-c, and one or more flood ports 538a-c. In this case, the underwater utility line 500 can include a second adjustably buoyant tube 510b disposed within the adjustably buoyant tube 510a. For example, the adjustably buoyant tube 510a can be concentrically located around the adjustably buoyant tube 510b. This configuration can be advantageous if it is desired to keep components of the underwater utility line 500 dry. For example, in one aspect, the transmission line 520 can be disposed within the adjustably buoyant tube 510b to keep the transmission line dry. In one aspect, the gas source 530 can be fluidly coupled to a space 513 between the outer adjustably buoyant tube 510a and the inner adjustably buoyant tube 510b, which are referred to collectively as the "adjustably buoyant tubes" or the "combined adjustably buoyant tube" 510. Thus, the gas injection valves 532a-c can selectively introduce gas into the space 513, the gas expulsion valves 534a-c can selectively evacuate gas from the space 513, and the flood ports 538a-c can selectively introduce water into the space 513 to adjust the buoyancy of the tubes. In other words, the exchange of gas and water can occur only within the space 513 between the adjustably buoyant tubes 510a, 510b, as occurs in the ballast tank of a submarine. The gas supply line 530 can therefore be in fluid communication with the space 513 between the outer adjustably buoyant tube 510a and the inner adjustably buoyant tube 510b, and the gas expulsion valves 534a-c and the flood ports 538a-c can be associated with the wall of the outer adjustably buoyant tube 510a.

In one aspect, the adjustably buoyant tube 510 can be divided into compartments 511a-c with one or more spacers 566 having one or more valves 536, 537 (i.e., fluid transit valves) included between the compartments 511a-c to allow fluid (water or gas as the case may be) to pass through (or transit) such spacers 566. When compartments are employed, such compartments can permit different sections of the combined adjustably buoyant tube 510 to have different buoyancy.

Figure 6:
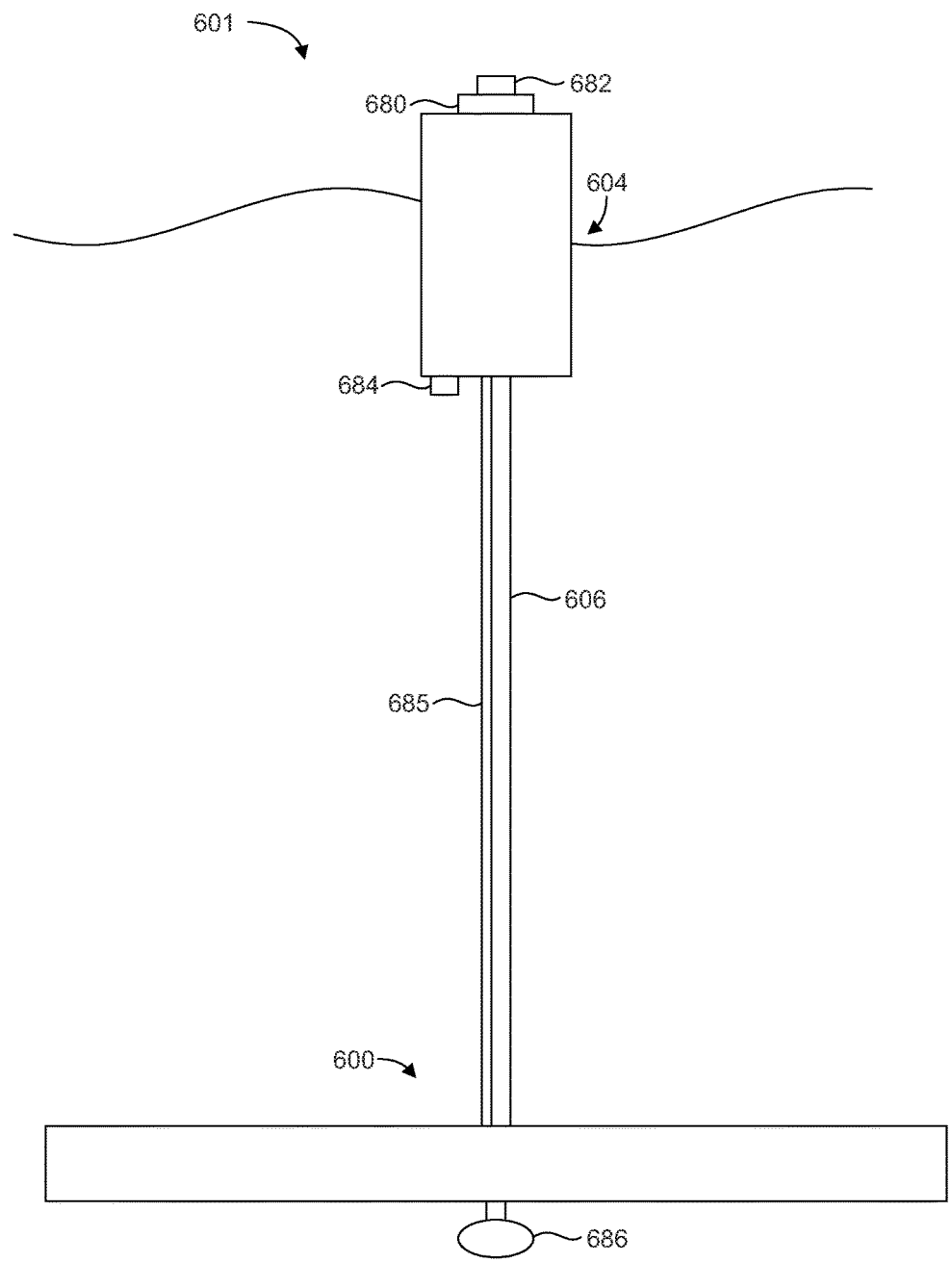
FIG. 6 is an illustration of an underwater utility system in accordance with an example of the present disclosure.

FIG. 6 illustrates an underwater utility system 601 in accordance with an example of the present disclosure. The system 601 can comprise an underwater utility line 600 such as is disclosed hereinabove. For example, the under water utility line 600 can include an adjustably buoyant tube, a transmission line within an interior of the adjustably buoyant tube, and a controller to control the buoyancy of the adjustably buoyant tube as described hereinabove. In one aspect, the underwater utility line may not be adjustably buoyant. The system 601 can also include one or more buoys 604 coupled to the underwater utility line 600, such as via a tether 606. The buoy 604 can have a computer 680, a global positioning system receiver 682 in communication with the computer 680 in order to determine the exact position of the underwater utility line 600, and a sonar unit 684. The drive device 686, the computer 680, the global position system receiver 682, and/or the sonar unit 684 can be connected to a source of power, which may be the electrical line associated with the underwater utility line 600.

The tether 606 between the buoy 604 and the underwater utility line 600 can be a cable, a rigid rod (e.g., fixed length or telescoping), or any other suitable tether configuration or structure. The electrical line of the underwater utility line 600 may be coupled to the electronic components via an electrical coupling 685 attached to or associated with the tether 606. If the electrical line is inside the underwater utility line 600, the electrical coupling 685 can therefore sealingly pass through a wall aperture in the underwater utility line 600. If the tether 606 is a rigid rod, the attachment of the tether 606 to the buoy 604 and/or the underwater utility line 600 can be rotatable about the pitch axis of the end of the tether 606 making such connection. In one aspect, the attachment may also be rotatable about the yaw axis of the end of the tether making such connection. Such rotational ability facilitates movement of the buoy 604 in relation to the underwater utility line 600 when the depth of the underwater utility line 600 is changed.

The system 601 can also include a drive device 686, such as a thruster, which may be associated with or attached to the underwater utility line 600. The computer 680 can be in communication with the drive device 686 to maintain a desired position of the adjustably buoyant tube 600. The drive device 686 can be rotatable and can receive gas from the gas supply line, pressurized water from the transmission line, and/or electricity from the electrical line either to pump water surrounding the drive device 686 or to operate a simple propeller that is known in the art to move the underwater utility line 600. When buoyancy compensators are utilized, only the versions of the drive device 686 that employ water may be practical since there may be no gas supply line in some embodiments.

If desired, the drive device 686 can also be utilized for initial installation of the underwater utility line 600. The buoy 604 can also include one or more traditional warning lights known in the art to mark the location of the underwater utility line 600 and thereby alert fishing boats not to drag fishing lines or nets into the underwater utility line. In one aspect, the underwater utility line 600 can be submerged to a sufficient depth to allow ocean traffic to travel overhead without danger of collision with the underwater utility line 600. It will, however, be apparent to one of ordinary skill in the art that the underwater utility line 600 can be raised to the surface or a shallow depth in order to reduce the cost of performing maintenance or performing a repair action.

Figure 7:
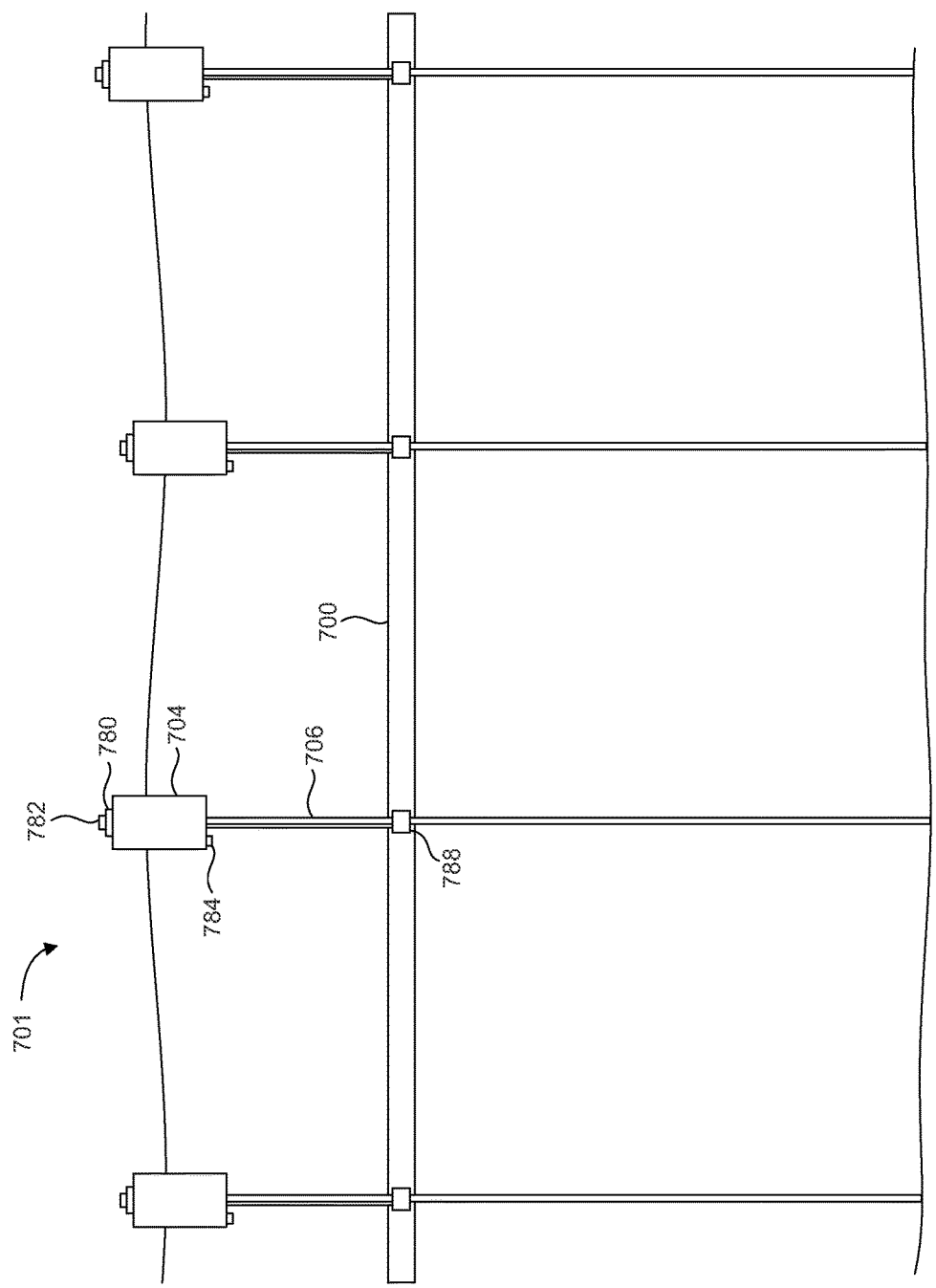
FIG. 7 is an illustration of an underwater utility system in accordance with another example of the present disclosure.

FIG. 7 is an illustration of an underwater utility system 701 in accordance with another example of the present disclosure. The system 701 can include an underwater utility line 700, which may or may not be adjustably buoyant, and one or more buoys 704 coupled to the underwater utility line 700, such as via tethers 706, which can comprise a cable, a chain, and/or a rod. The buoys 704 can also include a computer 780, a global position system receiver 782, and/or a sonar unit 784. In addition, the system 701 can include a drive device 788 operable with the tether 706 to raise and lower the underwater utility line 700 for any suitable purpose, such as the purposes mentioned above. The drive device 788 can include a gear, a pulley, or any other suitable mechanism to interface with the tether 706 and cause movement of the underwater utility line 700 along the tether. A motor of the drive device can receive power from an electrical line of the underwater utility line 700. In one aspect, a controller of the underwater utility line 700 can be used to control the drive mechanism 788, such that the drive mechanisms associated with the various buoy tethers 706 can operate in a coordinated manner.

Figure 8:
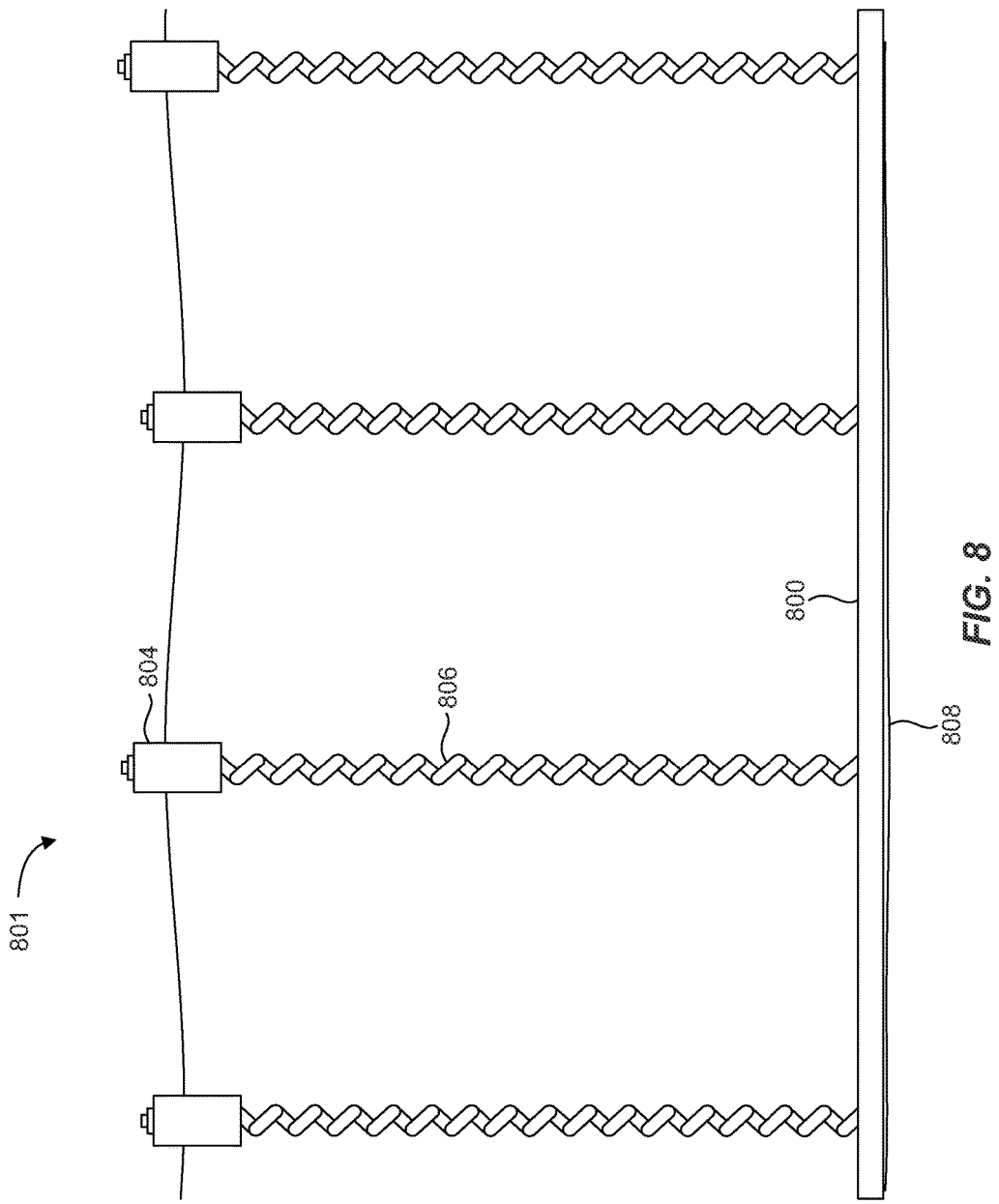
FIG. 8 is an illustration of an underwater utility system in accordance with yet another example of the present disclosure.

FIG. 8 is an illustration of an underwater utility system 800 in accordance with yet another example of the present disclosure. The system 801 can include an underwater utility line 800, which may or may not be adjustably buoyant, and one or more buoys 804, such as those described herein, coupled to the underwater utility line 800 via tethers 806. The tethers 806 can comprise a helical configuration to allow the buoys 804 to have unrestricted vertical movement upon waves in a body of water. In one aspect, the underwater utility line 800 can be configured to reside on an ocean floor 808. In another aspect, the underwater utility line 800 can be adjustably buoyant, as described hereinabove. Thus, the helical configuration of the tethers 806 can accommodate vertical movement of the underwater utility line 800 as buoyancy is adjusted to raise and lower the underwater utility line. The buoys 804 can serve to mark a location of the underwater utility line 800 and/or be used to generate power from wave energy.

For example, FIG. 9 illustrates an underwater utility system 901 in accordance with still another example of the present disclosure, in which buoys 904 are used to generate power from wave energy. An example of this configuration can be found in U.S. Provisional Patent Application No. 62/065,928, filed Oct. 20, 2014, and entitled, "A Buoy for Obtaining Energy from a Wave in a Body of Water," which is incorporated by reference in its entirety herein. The buoys 904 can be associated with power generators, such as pumps, and can be coupled to an underwater utility line 900 via tethers 906, which can serve as feed lines to deliver power from the power generators to a transmission line of the underwater utility line. For example, the buoys 904 can be configured to pump water and pressurized water can be conveyed through the tethers 906, which can be tubular, to the underwater utility line 900 for transfer to another location. The tethers or feed lines 906 can be resiliently flexible to allow the buoys 904 to have unrestricted movement to generate power. In one aspect, the tethers or feed lines 906 can comprise a helical configuration. The helical configuration can facilitate flexibility of the tubular tethers or feed lines 906 even when pressurized. The underwater utility line 900 may or may not be adjustably buoyant. The tethers or feed lines 906 can have some degree of buoyancy, which can be configured, as desired, such as to reduce or minimize a load on the buoys 904.

FIG. 10A is an illustration of an underwater utility system 1001 in accordance with a further example of the present disclosure, in which buoys 1004 are used to generate power from wave energy. An example of this configuration can be found in U.S. patent application Ser. No. 13/692,905, filed Dec. 3, 2012, and entitled, "Array of Buoys for Obtaining Energy from a Wave in a Body of Water," which is incorporated by reference in its entirety herein. The buoys 1004 can be associated with power generators and can be coupled to an underwater utility line 1000 via tethers 1006, which can serve as feed lines to deliver power from the power generators to a transmission line of the underwater utility line. As described above, the tethers or feed lines 1006 can be resiliently flexible and can have a helical configuration.

In a similar embodiment, FIG. 10B illustrates an underwater utility system 1101 having the same basic structure as found in the underwater utility system 1001 of FIG. 10A. In this case, the underwater utility system 1101 includes an extension member 1190 extending downward from a frame 1191. The extension member 1190 can serve as a pendulum as disclosed in U.S. Provisional Patent Application No. 62/065,928 and incorporated by reference hereinabove. The extension member 1190 can extend from a middle portion of the frame 1191, such as below a fixed buoy 1192. The extension member 1190 can be made heavy enough such that no rocking motion is allowed or light enough such that a little rocking motion is allowed but with positive stability.

Buoys 1104a, b can be associated with power generators and can be coupled to an underwater utility line 1100 via tethers or feed lines 1106a, b, which can combine to form a common tether or feed line 1106c that extends to the utility line. In one aspect, the tethers or feed lines 1106a, b can combine at, and/or be coupled to, the extension member 1190. Thus, the extension member 1190 can support the tether or utility lines 1106a, b so that movement of the movable buoys 1104a, b is not hindered. Such tethers or feed lines can serve to deliver power from the power generators to a transmission line of the underwater utility line 1100. As described above, the tethers or feed lines 1106a-c can be resiliently flexible and can have a helical configuration, such as when delivering pressurized water, or the tethers or feed lines can simply comprise an electrically conductive cable if transferring electricity.

Such underwater utility systems 901, 1001, 1101 as illustrated in FIGS. 9, 10A, and 10B, respectively, can be dragged behind a ship and used to provide supplemental power to the ship. In this case, a tow line may be used to couple with a frame associated with the buoys to tow the underwater utility system and protect the underwater utility line from being subjected to tensile forces that may damage the utility line. When towing such underwater utility systems, power generation by induction may be preferred due to the wave motion characteristics of towing the system behind a ship.

FIG. 11 is a side view of a tether or feed line 1206 of an underwater utility system in accordance with an example of the present disclosure. The tether or feed line 1206 can comprise a helical configuration and can include a support structure 1207 to maintain the helical configuration during use. In one aspect, the support structure 1207 can comprise an outer sheath to provide external support to the tether or feed line 1206. The outer sheath may or may not be permanently attached to the tether or feed line 1206.

FIG. 12 is a top view of a tether or feed line 1306 of an underwater utility system in accordance with another example of the present disclosure. The tether or feed line 1306 can comprise a helical configuration and can include a support structure 1307 to maintain the helical configuration during use. In this case, the support structure 1307 can comprise an inner webbing attached to an interior portion of the helical tether or feed line 1306 to provide internal support to the tether or feed line.

Furthermore, in accordance with one embodiment of the present disclosure, a method for transferring energy through a body of water is disclosed. The method can include connecting an underwater utility line to an energy source and an energy destination, the underwater utility line having an adjustably buoyant tube, and a transmission line to transfer energy disposed in an interior of the adjustably buoyant tube. The method can also include providing gas to the adjustably buoyant tube. In addition, the method can include controlling the gas provided by the gas source to alter the buoyancy of the adjustably buoyant tube. In one aspect, the method can further comprise expanding or contracting the adjustably buoyant tube with the gas to alter the buoyancy of the adjustably buoyant tube. It is noted that no specific order is required in this method, though generally in one embodiment, these method steps can be carried out sequentially.

It is to be understood that the embodiments of the disclosure disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the disclosure. One skilled in the relevant art will recognize, however, that the technology can be practiced without one or more of the specific details, or with other methods, components, materials, etc. In other instances, well-known structures, materials, or operations are not shown or described in detail to avoid obscuring aspects of the disclosure.

While the foregoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. An underwater utility line, comprising:
    an adjustably buoyant tube;
    a transmission line to transfer energy disposed in an interior of the adjustably buoyant tube;
    a gas source fluidly coupled to the interior of the adjustably buoyant tube to provide gas thereto;
    a controller to control the gas provided by the gas source to alter the buoyancy of the adjustably buoyant tube;
    a gas injection valve in fluid communication with the gas source;
    a gas expulsion check valve associated with a wall of the adjustably buoyant tube; and
    an electrical line to power the gas injection valve and the gas expulsion check valve,
    wherein the controller communicates with and controls the gas injection valve and gas expulsion check valve, and
    wherein the gas injection valve selectively introduces gas into the adjustably buoyant tube and the gas expulsion valve selectively evacuates gas from the adjustably buoyant tube to adjust the buoyancy of the tube.

2. The underwater utility line of claim 1, further comprising a second adjustably buoyant tube disposed within the first adjustably buoyant tube, wherein the transmission line is disposed within the second adjustably buoyant tube and the gas source is fluidly coupled to a space between the first and second adjustably buoyant tubes.

3. The underwater utility line of claim 2, wherein the wall is of the first adjustably buoyant tube, wherein a flood port is also associated with the wall of, wherein the electrical line to also power the flood port, wherein the controller also communicates with and controls the flood port, and wherein the gas injection valve selectively introduces gas into the space, the expulsion valve selectively evacuates gas from the space, and the flood port selectively introduces water into the space to adjust the buoyancy of the tubes.

4. The underwater utility line of claim 1, wherein the gas source comprises a gas supply line.

5. The underwater utility line of claim 1, wherein the adjustably buoyant tube is diametrically expandable by gas.

6. The underwater utility line of claim 1, wherein the adjustably buoyant tube has a fixed diameter.

7. The underwater utility line of claim 1, further comprising one or more flood ports associated with a wall of the adjustably buoyant tube.

8. The underwater utility line of claim 1, wherein the adjustably buoyant tube is divided into a plurality of compartments.

9. The underwater utility line of claim 8, further comprising one or more spacers to divide the adjustably buoyant tube into the plurality of compartments.

10. The underwater utility line of claim 8, further comprising a valve between the one or more compartments.

11. The underwater utility line of claim 1, further comprising a buoyancy compensator in fluid communication with the gas source to alter the buoyancy of the adjustably buoyant tube.

12. An underwater utility system, comprising:
    an underwater utility line including:
        an adjustably buoyant tube,
        a transmission line within an interior of the adjustably buoyant tube, and
        a controller to control the buoyancy of the adjustably buoyant tube;
    a feed line having a helical configuration; and
    a buoy coupled to the underwater utility line via the feed line.

13. The underwater utility system of claim 12, wherein the underwater utility line is configured to reside on an ocean floor.

14. The underwater utility system of claim 12, wherein the buoy is coupled to the underwater utility line via a tether.

15. The underwater utility system of claim 14, wherein the tether comprises a cable, a chain, or a combination thereof.

16. The underwater utility system of claim 14, further comprising a drive device operable with the tether to raise and lower the underwater utility line.

17. The underwater utility system of claim 16, wherein the drive device is associated with the underwater utility line.

18. The underwater utility system of claim 12, wherein the buoy is associated with a power generator and the buoy is coupled to the underwater utility line via the feed line to deliver power to the transmission line.

19. The underwater utility system of claim 12, wherein the feed line is resiliently flexible.

20. The underwater utility system of claim 12 wherein the feed line includes a support structure to maintain the helical configuration during use.

21. A method for transferring energy through a body of water, comprising:
    connecting an underwater utility line to an energy source and an energy destination, the underwater utility line having an adjustably buoyant tube, and a transmission line to transfer energy disposed in an interior of the adjustably buoyant tube;
    providing gas to the adjustably buoyant tube;
    controlling the gas provided by the gas source to alter the buoyancy of the adjustably buoyant tube; and
    connecting the underwater utility line to a buoy via a feed line with a helical configuration.

22. The method of claim 21, further comprising expanding or contracting the adjustably buoyant tube with the gas to alter the buoyancy of the adjustably buoyant tube.

23. The underwater utility line of claim 1, further comprising a feed line connected to the underwater utility line.

24. The underwater utility line of claim 23, wherein the feed line has a helical configuration.

25. The underwater utility line of claim 23, wherein the feed line is also connected to a buoy.

26. An underwater utility line, comprising:
    an adjustably buoyant tube;
    a transmission line to transfer energy disposed in an interior of the adjustably buoyant tube;
    a gas source;
    a controller to control the gas provided by the gas source to alter the buoyancy of the adjustably buoyant tube; and a second adjustably buoyant tube disposed within the adjustably buoyant tube, wherein the transmission line is disposed within the second adjustably buoyant tube and the gas source is fluidly coupled to a space between the adjustably buoyant tube and the second adjustably buoyant tube.

27. The underwater utility line of claim 26, wherein the gas source comprises a gas supply line.

28. The underwater utility line of claim 26, wherein the adjustably buoyant tube is diametrically expandable by gas.

29. The underwater utility line of claim 26, wherein the adjustably buoyant tube has a fixed diameter.

30. The underwater utility line of claim 26, further comprising one or more flood ports associated with a wall of the adjustably buoyant tube.

31. The underwater utility line of claim 26, wherein the adjustably buoyant tube is divided into a plurality of compartments.

32. The underwater utility line of claim 31, further comprising one or more spacers to divide the adjustably buoyant tube into the plurality of compartments.

33. The underwater utility line of claim 31, further comprising a valve between the one or more compartments.

34. The underwater utility line of claim 26, further comprising a buoyancy compensator in fluid communication with the gas source to alter the buoyancy of the adjustably buoyant tube.

* * * * *